United States Patent Office 3,071,475
Patented Jan. 1, 1963

3,071,475
PROCESS OF PREPARING AN HERB-FLAVORED EDIBLE OIL
Edalene Stohr, New York, N.Y., assignor to American Can Company, New York, N.Y., a corporation of New Jersey
No Drawing. Filed June 21, 1960, Ser. No. 37,587
1 Claim. (Cl. 99—118)

This invention relates to the preparation of a plurality of separate and individual containers of an herb flavored edible and particularly those in which herbs are intermixed with liquids.

Various herb flavored edibles, for example, salad dressings, onion flavored vegetable oil, cooking oils and the like have been made in the past. In some of these prior edibles the herbs were crushed or boiled in a vegetable oil, grease or fat to extract the flavor from the herb. It is well known that hot oils extract the flavor better than cold oils.

One of the main problems encountered has been that of preparing a plurality of individual containers with seasoned or herb flavored edibles wherein the edible in each container is substantially identical in flavor, appearance and physical characteristics ot the edible in the other containers. This is particularly true in salad dressing and cooking oils wherein some of the flakes or leaves of the herbs float in the oil. If the herbs and oils are mixed in a large vat and the mixed herbs and oils then dispensed from the large vat into the individual containers the resultant edible in the various containers are not alike in taste, appearance and physical characteristics. The reason for this is that more flakes are often dispensed into one container than into another container.

Another problem encountered relates to the speed of extraction of the flavor from the herb leaves or flakes. When some quantities of flavored edibles are being made the flakes may be boiled in the liquid for a long period of time. However, in commercial production the time element of flavoring the liquid should be kept as short as possible.

One of the objects of the present invention is to overcome the aforementioned difficulties and problems heretofore encountered.

Another object of the present invention is to provide herb flavored edibles from liquid and herb flakes wherein some of the flakes are powdered.

Another object of the invention is to provide the process of preparing a plurality of separate and individual containers of herb flavored edibles from herbs and liquid with the herb flavored edible in each container having substantially identical flavor, appearance and physical characteristics to the edibles in the other containers.

Numerous other objects and advantages of the invention will be apparent as it is better understod from the following description which is of a preferred embodiment thereof.

The process relates to commercially preparing a plurality of separate and individual containers of an herb flavored edible from herbs and fluids or liquids. Because the liquid most commonly used is oil for salad dressings, cooking, deep frying and the like, the description hereafter refers to oil for purpose of easier understanding and not for the purpose of limitation. The herb flavored edible in each container has substantially identical flavor, appearnace and physical characteristics to the edible in the other containers. The first step in the process is that of forming a mixture consisting of herb flakes capable of flavoring oil. The term flakes is meant to include leaves, stems or other particles of herbs which are capable of flavoring oil and float in or be visibly mixed in the oil they are flavoring. All of the flakes may be of the same herb flavor, or they may be of several varieties and flavors of herbs. After dividing this mixture of herbs into two parts, one part is pulverized to convert that one part of the herb flakes to an herb powder capable of rapidly flavoring oil and of particle sizes so small that the powder paritcles are substantially invisible when mixed in the oil. The following step in the process is that of dispensing a plurality of measured equal portion of the powder into the containers with each one of said measured equal portions in its respective one of said containers, a plurality of measured equal portions of the flakes which had not been pulverized or powdered and are yet in the visible particle size or dispensed into the containers with each one of said measured equal portions in its respective one of said containers. After heating a quantity of liquid or oil a plurality of measured equal portions of the heated oil are dispensed into the containers with each one of said measured equal portions in its respective one of said containers. The oil in each container is in direct contact with the herb flakes and herb powder in the respective container to thereby extract the flavor from the herb powder and suspend the herb flakes in the oil. Each container is next sealed and the oil and herb flakes therein are allowed to cool into the herb flavored edible.

As a specific example several containers of herb flavored edibles were made in the following steps:

1 tablespoon basil
1 tablespoon thyme
3 tablespoons parsley flakes
1½ teaspoons tarragon
½ teaspoon dill all in individual or flake form were mixed together. After these herbs had been thoroughly mixed the mixture was divided into two parts and one part was pulverized into an herb powder, the pulverizing being done in a grinder. Following this one teaspoon of the finely-ground powder and 1½ teaspoons of the whole flakes were dispensed in each container. Vegetable oil, commonly sold as Wesson oil, was then heated to a temperature of between 130° and 150° F. and two cups full of the Wesson oil were dispensed into each container and mixed with the herb powders and flakes in the respective container. The mixture was then allowed to steep and cool to form the herb flavored edible. The edible obtained in this manner can be used either as a salad dressing wherein it is poured directly over leafy vegetables or it can be used as a cooking fat. A uniform taste, flavor, appearance and physical condition is maintained throughout all of the containers constructed in this manner.

It is thought that the invention and many of its attendant advantages will be understood from the foregoing description and it will be apparent that various changes may be made in the matter of the ingredients, their identity, and their proportions and in the steps of the process and their order of accomplishment without departing from the spirit and scope of the invention or sacrificing all of its material advantages, the form hereinbefore described being merely a preferred embodiment thereof.

I claim:
The process of preparing an herb-flavored edible oil in individual consumer-size containers comprising the steps of forming a mixture of uniformly commingled herb flakes of diverse flavors, separating said mixture into distinct portions, pulverizing one of said portions to a powder-like consistency, feeding measured quantities of each of said pulverized and said flake portions into each of said containers, and adding to each container a predetermined quantity of a selected edible oil in a heated state to disperse said herb portions in said oil uniformly in each of said containers, whereby said heated oil extracts flavor principally from said pulverized portion which becomes substantially imperceptible therein and suspends said flake portion randomly and perceptibly therein.

References Cited in the file of this patent

UNITED STATES PATENTS

| | | |
|---|---|---|
| 1,140,629 | Sulzberger | May 25, 1915 |
| 2,201,112 | Musher | May 14, 1940 |
| 2,548,284 | Battaglia | Apr. 10, 1951 |
| 2,549,781 | Emmons et al. | Apr. 24, 1951 |